Oct. 3, 1967             W. T. RENTSCHLER            3,344,727
PHOTOGRAPHIC CAMERA WITH DISTANCE AND DIAPHRAGM
APERTURE SETTING MEMBERS
Filed Aug. 25, 1964

INVENTOR.
*Waldemar T. Rentschler*

BY

*Arthur A. March*
ATTORNEYS

United States Patent Office 3,344,727
Patented Oct. 3, 1967

3,344,727
PHOTOGRAPHIC CAMERA WITH DISTANCE AND DIAPHRAGM APERTURE SETTING MEMBERS
Waldemar T. Rentschler, Calmbach (Enz), Germany, assignor to Alfred Gauthier, G.m.b.H., Calmbach (Enz), Germany, a corporation of Germany
Filed Aug. 25, 1964, Ser. No. 391,901
Claims priority, application Germany, Aug. 28, 1963, G 38,567
8 Claims. (Cl. 95—64)

ABSTRACT OF THE DISCLOSURE

A camera having a guide line, or channel, scale joining a diaphragm aperture scale having one arrangement of spacing between successive aperture size settings to a focusing scale having a different, for example a nonlinear, arrangement of spacing between successive focal indicia. The camera includes a pointer that moves along the guide line scale in response to movement of the focus control and a tracking pointer that is moved along the other side of the guide line scale to a corresponding setting by the diaphragm control.

---

This invention relates to a photographic camera with a distance setting member provided with an indicator which cooperates with a fixed nonlinear scale and a diaphragm aperture control associated with a linear setting scale.

In the past it has been proposed to couple the distance setting member to the diaphragm aperture setting member so that the simultaneous setting of the distance and of the guide number of the type of flashbulb used, automatically sets the diaphragm aperture at the right value. For this purpose, the known arrangements have used a transmission mechanism which correlates the linear and nonlinear characteristics, respectively, of the diaphragm aperture and distance setting members. Thus, a member provided for coupling with the diaphragm setting member is actuated by the setting motion of the distance setting member. The main disadvantage of this correlating mechanism is that it not only occupies part of the limited space available in a shutter, but also increases the production cost of the camera.

In order to simplify the diaphragm setting in the case of photoflash exposures, it has also been proposed to connect the progressively graduated nonlinear scale on the distance setting member to an interpolating scale, by guide lines, in order to obtain the proper diaphragm aperture values. The diaphragm aperture value to be set on the camera can be read on the guide line of the distance value set in each particular case. This device is still imperfect since the proper diaphragm value read on the interpolating scale, to be transmitted to the diaphragm setting mechanism, may be forgotten. It is also possible to inadvertently set another value which does not coincide with the diaphragm aperture value read on the scale. This transmission process, which requires time and attention, does not meet the requirements of operational simplicity and quick handling that have come to be expected in modern cameras.

It is an object of the present invention to avoid the above-described disadvantages of the known devices for mutually adjusting the different setting characteristics of the distance and diaphragm aperture setting members, in the case of photoflash exposures.

The present invention solves this problem by providing a channel or guide line scale, of a type known per se, to be associated with the distance scale and designed to correlate the characteristics of the distance and diaphragm aperture scales. There is also associated with the diaphragm aperture setting member a resetting indicator which must be set at the same guide line as the indicator of the distance setting member in order to pair the distance and diaphragm aperture values in accordance with the guide number equation. This arrangement creates a device for correlating the different setting characteristics of the distance and diaphragm aperture scales, as well as for setting distance and diaphragm values correctly paired with respect to the guide number in the case of photoflash exposures. This device requires no additional space for installation and is so simple to operate that it avoids any irritations and maladjustments of the camera. In order to set the camera correctly, i.e. with respect to the guide number after the photographer has preset the distance value and possibly the guide number value, all that remains is to place the resetting indicator opposite the channel or guide line scale leading away from the distance value set on the distance setting member.

Another object of the invention is to provide an embodiment which is especially suited for cameras with an intra-lens shutter and in which the channel or guide line scale may be marked on the shutter front plate between the distance and the diaphragm aperture setting members, in the same manner as the distance scale.

A further embodiment of the invention comprises a channel or guide line scale together with a distance scale arranged on the housing of the camera, preferably on the top. In that case, the indicator cooperating with the distance scale is operatively connected to the distance setting member and the resetting indicator is operatively connected to the diaphragm aperture setting member, each by way of a gear arrangement.

In photographic cameras having setting members for distance and diaphragm, as well as another setting member used for taking into consideration differing guide number values, the guide number setting member may be adapted to connect to the diaphragm aperture setting member in different relative positions by means of a releasable coupling. In this way, the guide number setting member can be moved synchronously with the diaphragm member, and may carry the indicator used for resetting, and a particularly clear setting operation will result.

In order to obtain flexibility and freedom of choice in the structure of the device, the diaphragm aperture setting member may be associated with a transmission member which can be moved synchronously with the former and which may carry either the resetting indicator or the guide number setting member.

The diphragm aperture setting member may be operatively connected to the transmission member by a gear drive in order to insure the synchronous running of the two members. An even simpler kind of coupling can be obtained in which the diaphragm aperture setting member is connected to the transmission member by means of an arcuate member.

Details of the invention will become apparent from the specification which follows and from the accompanying drawings which illustrate several embodiments of the subject matter of the invention and in which:

FIG. 1 shows the arrangement of a channel scale located between the distance and diaphragm aperture setting members. The setting members are indicated as slides;

FIG. 2 is a top view of the camera shutter provided with a channel scale;

FIG. 3 is a partial front view of the shutter, as seen from the bottom, equipped with a guide for indicating the depths of field;

FIG. 4a is a partial section view of the shutter showing the transmission arrangement designed to connect the diaphragm aperture setting member to the guide number setting member;

FIG. 4b illustrates another way of connecting the diaphragm aperture setting member to the guide number setting member; and FIG. 5 is a top elevational view of the arrangement of the distance channel and diaphragm scales on the housing of a photographic camera.

In the drawings, a housing, or case, 1 of a photographic camera has a photographic intra-lens shutter 2 affixed on the front thereof, in a known manner. An annular diaphragm setting member 3 rotatably mounted on housing 2a of the intra-lens shutter 2 is arranged coaxially with the shutter and influences a diaphragm mechanism (not shown in the drawing). In addition, the member 3 carries a linearly graduated diaphragm scale 4 with which is associated a fixed setting mark 5 that indicates the diaphragm value that has been set. Rotatably mounted on the shutter housing 2a and coaxial with the diaphragm setting member 3 is an exposure time setting member 6 which cooperates with an exposure time escapement mechanism (not shown in the drawings). A mark 7 on the setting member 6 is associated with an exposure time scale 8 arranged on the shutter housing 2a. The exposure time value, or shutter speed, of 1/30 of a second, which must be set to carry out photoflash exposures, is especially identified by a flash symbol.

According to the embodiment illustrated in FIG. 1, a setting member 9 may be arranged on the diaphragm aperture setting member 3 for taking into consideration the guide number of the flashbulb used. The setting member 9 has a guide number scale 9a which is set with reference to a mark 3a on the diaphragm aperture setting member 3. The latter and the guide number setting member 9 can be connected to each other in different relative positions, identified by the guide number values of the scale 9a. For this purpose, a spring loaded coupling pin 10 may be attached to the guide number setting member 9 to engage any holes 3b of the diaphragm aperture setting member 3. The holes 3b are spaced along the member 3 at distances corresponding to distances of the scale values of the guide number scale 9a, which means that a coupling between the guide number setting member 9 and the diaphragh aperture setting member 3 can be established at each marked position of the guide number setting member.

As will be apparent from FIGS. 2 and 5, the guide number setting member 9 and the diaphragm aperture setting member 3 may be arranged in a spacially remote relationship. FIG. 2 shows an annular guide number setting member 11 rotatably positioned on the front of the housing 2a of the intra-lens shutter 2, while FIG. 5 shows a guide number setting member 12 arranged on the upper side of the camera housing 1. In FIG. 5 the gear connection between the guide number setting member 12, with its guide number scale 12a, and the diaphragm aperture setting member 3 located at the rear of the shutter housing 2a, is indicated by a dash-dot line. The end, or final, member of the gear chain consists of a front disk 13 which serves as a carrier of the guide number setting member 12 and comprises a setting mark 13a that cooperates with the guide number scale 12a.

In the embodiment in FIG. 2, the diaphragm aperture setting member 3 and the guide number setting member 11 are connected to each other in such a way that they always execute synchronous, rotary motions. For this purpose, a gear drive, such as is shown in FIG. 4a, may be used. This gear drive comprises a shaft 14 rotatably positioned in the lateral wall of the shutter housing 2a and having pinions 15 and 16 nonrotatably connected to it at both ends. The pinion 15 meshes with the teeth on the diaphragm aperture setting member 3, while the pinion 16 meshes with the teeth on a ring-shaped transmission member 17. As is apparent from FIG. 2, the member 17 is coaxial with the setting members 3 and 11, and has a guide number scale 17a which cooperates with a mark 11a on the guide number setting member 11. A coupling spring 18, shown in FIG. 4a, which has a finger piece 18a as well as a detent at its free end, may also be attached to the transmission member 17. The detent releasably engages with one of the arresting, or stop, recesses 11c which are arranged on the guide number setting member 11 to coincide with the graduation of the guide number setting scale 17a.

FIG. 4b shows that instead of using the gear drive or transmission mechanism 14–16 of FIG. 4a for connecting the diaphragm aperture setting member 3 to the guide number setting member 11, an arcuate member 19 may be used, which is firmly connected to both the diaphragm setting member 3 and the transmission member 17. Similarly, as illustrated in FIG. 4a, the transmission member 17 may be connected to the guide number setting member 11 by means of a releasable coupling spring.

Attached at the front of the shutter housing 2a, in a manner known per se, is a front plate 20 in front of which there is located a rotatable distance setting member 21. A fixed distance scale 22 with progressive nonlinear graduation is used in setting the distance setting member 21. In the embodiment in FIG. 1, the distance scale 22 is arranged on the front plate 20 and cooperates with an indicator 23 on the distance setting member 21. Preferably, the indicator 23 is provided with a window 23a in which the distance value becomes visible. In the embodiment in FIG. 5, the distance scale 22 is located on the upper side of the camera housing 1, concentrically with the guide number setting member 12. Cooperating with the distance scale 22 is an indicator or pointer 25 operatively connected to the distance setting member 21 and arranged coaxially with pin 24 of the guide number setting member 12. The front lens mount, which is coupled with the distance setting member 21, includes a control cam 21a, and a pin 26, mounted so as to be displaceable in the direction of the optical axis, serves as a cam follower to sense the position of the cam 21a. The pin 26, in turn, is operatively connected to the indicator 25 by way of additional gears which are merely indicated by a dot-dash line for the sake of simplicity.

In order to establish a simple setting operation in the case of photoflash exposures, with the least possible structural expenditure, a channel or guide line scale 27 is associated with the setting scale 22 of the distance setting member 21. This scale arrangement, known per se in exposure meters and counting or computing devices, is provided for the purpose of correlating the nonlinear setting characteristic of the distance setting member 21 to the linear characteristic of the diaphragm aperture setting member 3. A specific distance value of the scale 22 is associated with each channel or guide line scale. In order to facilitate the setting of distance and diaphragm values which are to be paired and correlated with a guide number, a resetting indicator 9b in FIG. 1 or 11b in FIG. 2 or 12b in FIG. 5 is associated either with the diaphragm setting member 3 or the respective guide number setting members 9, 11, or 12. These members 9, 11, or 12 can be associated with the diaphragm setting member 3. The correlating of a diaphragm value with a previously set distance value according to the guide number equation $L = B \times E$, in which L is the guide number, B is the diaphragm value, and E is the distance value, is effected by rotating the diaphragm aperture setting member 3 until the resetting indicator 9b, 11b or 12b is opposite the same channel or guide line of the scale 27 as the indicator mark 23 or 25 of the distance setting member 21. In FIGS. 1 and 2, the diaphragm aperture setting member 3, if it is to be set correctly, would have to be moved to the right into the range of the channel associated with the distance value 1.8 m., that has been set. The set diaphragm value, as identified by the mark 5, may then be read on the diaphragm scale 4.

The arrangement of the channel or guide line scale 27 depends in each particular case on the position and arrangement of both the distance scale and the diaphragm setting member 3, or of the guide number setting members 9, 11, or 12. Accordingly, the channel or guide line scale 27 in the embodiment according to FIG. 2 is arranged on the outer jacket of the front plate 20, while the scale in the embodiment illustrated in FIG. 5 is arranged on the upper side of the camera housing 1 between the distance scale 22 and the guide number setting member 12.

For the purpose of indicating the depth of focus available for an exposure, another scale 28 corresponding to the distance scale 22 may be arranged on the distance setting member 21 of the shutter 2. Associated with the scale 28 are a fixed setting mark 29, arranged at the front plate 20, and two diaphragm scales 30 extending from the mark on both sides, see FIG. 3. The diaphragm scales 30 in connection with the scale 28 make it possible to read the range within which the images will be in focus and sharply depicted for a specific diaphragm aperture value. In the embodiment according to FIGS. 2 and 3, the above scale arrangement and the values set for diaphragm and exposure distances will result in a depth of focus of about 1.10 m. to 3 m. This means that all objects located within this distance range in front of the camera will be reproduced sharply on the film when a photograph is taken.

In the embodiment according to FIGS. 2 and 3, the upper surface area of the front plate 20, facing the photographer in normal camera position, is occupied by the distance scale 22 and the channel or guide line scale 27. In this case, the scales 28 and 30, for indicating the depth of focus, are arranged on the inside of either the front plate 20 or the distance setting member 21. In the camera illustrated in FIG. 5, on the other hand, the scale and mark arrangement, designed to set and correlate the diaphragm aperture and distance factors with the guide number in the case of photoflash exposures, is mounted on the upper side of the camera housing 1. This makes it possible to arrange the scales 28 and 30, designed to indicate the depth of focus, on the distance setting member 21 or on the front plate 20. In this position they are located in the field of vision of the photographer when the camera is held in normal position.

While this invention has been described in terms of the specific embodiments, it will be understood by those skilled in the art that various modifications may be made therein without departing from the true scope of the invention as determined by the following claims.

I claim:
1. In a photographic camera having a case and a shutter housing including a distance setting member and a diaphragm setting member, the improvement comprising:
 (a) an indicator carried by said distance setting member;
 (b) a fixed, progressively graduated, non-linear distance scale cooperatively associated with said indicator;
 (c) a linear setting scale associated with said diaphragm setting member;
 (d) a channel scale associated with said graduated distance scale to correlate the settings of said distance scale to the settings of said linear setting diaphragm scale; and
 (e) a resetting indicator operatively associated with said diaphragm setting member which is set to the same channel of said channel scale as said indicator of the distance setting member for pairing the distance and diaphragm scale values true to the guide number equation when carrying out photoflash exposures.

2. The invention as defined in claim 1 wherein
 (a) said diaphragm and distance setting members are coaxially spaced; and
 (b) said channel scale and said distance scale are disposed on the front plate of the shutter housing between said setting members.

3. The invention as defined in claim 1 wherein
 (a) said channel scale and said distance scale are arranged on said camera case; and
 (b) said indicator and said resetting indicator is remotely connected to the distance setting member and diaphragm setting member, respectively.

4. In a photographic camera having a distance setting member, a diaphragm setting member, and a setting member for guide number values, the improvement comprising:
 (a) an indicator moved by said distance setting member;
 (b) a fixed progressively graduated, distance scale associated with said indicator;
 (c) a second linearly graduated scale comprising diaphragm values;
 (d) a channel scale between said distance scale and said second scale to correlate the respective readings thereof;
 (e) means releasably connecting said guide number setting member to said diaphragm setting member to effect different relative adjusted positions therebetween, whereby said guide number setting member may be synchronously moved in any of the relative adjusted positions thereof when said diaphragm setting member is set; and
 (f) a resetting indicator operatively attached to said guide number setting member whereby said diaphragm setting member is reset to a given distance setting.

5. The invention as defined in claim 4 and including:
 (a) a transmission member;
 (b) means connecting said transmission member for synchronous movement with said diaphragm setting member;
 (c) means for releasably coupling said guide number setting member to said transmission means, said transmission means comprising a carrier for said resetting indicator.

6. The invention as defined in claim 5 wherein said connecting means includes:
 (a) a gear drive operatively connecting said diaphragm setting member and said transmission member to insure synchronous operation thereof.

7. The invention as defined in claim 5 wherein said connecting means includes:
 (a) an arcuate link rigidly connected to said diaphragm setting member and to said transmission member to actuate the latter.

8. A photographic camera comprising:
 (a) a camera casing;
 (b) a shutter housing connected to said casing;
 (c) a distance setting member and a diaphragm setting member mounted on said shutter housing in coaxially disposed relationship;
 (d) a distance scale and a cooperatively associated channel scale fixed on said shutter housing adjacent said distance setting member;
 (e) an indicator carried by said distance setting member for adjusting the same to a given setting on said distance scale;
 (f) a guide number setting member having a guide number scale cooperatively associated with said diaphragm setting member, said diaphragm setting member having a linear diaphragm setting scale and mark to which said scale of said guide number setting member is set;
 (g) means for releasably connecting said guide number setting member relative to said diaphragm setting member to effect relative adjustment therebetween;
 (h) a resetting indicator operatively associated with said guide number setting member; and
 (i) means for synchronously moving said diaphragm setting member and guide number setting member in the relative adjusted position therebetween to reset the resetting indicator to a position complementary to the setting of said distance setting member so as to effect a proper exposure.

References Cited

UNITED STATES PATENTS

| | | | |
|---|---|---|---|
| 2,829,574 | 4/1958 | Gebele | 95—64 |
| 2,936,690 | 5/1960 | Whitman | 95—64 |
| 2,989,908 | 6/1961 | Bolsey | 95—64 |
| 3,015,998 | 1/1962 | Van Der Mei | 95—10 |
| 3,071,056 | 1/1963 | Gebele | 95—64 |

NORTON ANSHER, *Primary Examiner.*

J. F. PETERS, *Assistant Examiner.*